United States Patent [19]

Kopczynski et al.

[11] 4,042,231
[45] Aug. 16, 1977

[54] PIPE CLAMPING DEVICE

[75] Inventors: John F. Kopczynski; Paul F. Kluczynski, both of North Tonawanda, N.Y.

[73] Assignee: CRC - Automatic Welding, Division of Crutcher Resources Corporation, Houston, Tex.

[21] Appl. No.: 688,676

[22] Filed: May 21, 1976

[51] Int. Cl.² .............................................. B23P 19/00
[52] U.S. Cl. .................................................. 269/48.1
[58] Field of Search ........................... 269/48.1; 279/2; 228/44.5, 49

[56] References Cited

U.S. PATENT DOCUMENTS

| 2,853,876 | 9/1958 | Majkrazak | 279/2 |
| 3,005,619 | 10/1961 | Bowen | 279/2 |
| 3,644,977 | 2/1972 | Valentine | 269/48.1 |
| 3,741,457 | 6/1973 | Gwin et al. | 269/48.1 |

Primary Examiner—Al Lawrence Smith
Assistant Examiner—Robert C. Watson
Attorney, Agent, or Firm—Joseph P. Gastel

[57] ABSTRACT

A device for clamping into engagement with the inside of a pipe comprising a central shaft, rotatable actuator members axially spaced on the shaft and journalled thereon, piston and cylinder type of hydraulic motors coupled to the axially spaced actuators for rotating the actuators, spaced frames fixedly mounted on the shaft, plunger members mounted for radial sliding movement in the frames, and coplanar links connected between the plungers and the spaced actuators for moving said plungers radially toward and away from the inside of said pipe. In one embodiment the spaced actuators are rotated simultaneously in opposite directions because they are connected to opposite ends of the hydraulic motors. In another embodiment separate hydraulic motors rotate the actuators independently of each other.

18 Claims, 11 Drawing Figures

PIPE CLAMPING DEVICE

The present invention relates to an improved device for effecting clamping engagement with the inside of a pipe.

By way of background, various types of internal pipe clamps have been used in the past in conjunction with large diameter pipes of the type used for oil and gas pipelines, and such clamps are exemplified by structure shown in U.S. Pat. Nos. 3,031,994, 3,044,431, 3,229,972 and 3,270,411. The last three patents include linkage structure for driving plungers radially outwardly into engagement with the inside of a pipe. However, this linkage structure moves in a direction axially of the pipe as well as radially. In addition, the motor means which drives this linkage provides motion in a direction axially of the pipe. The foregoing relationship produces a number of undesirable results, namely, objectionable stresses on the linkages and the motors, less than optimum movement of the plungers in relation to the required movement of the motors, and warping and distortion of the various parts, leading to their premature repair and replacement. The hydraulic system of U.S. Pat. No. 3,031,994 produces a direct radial action of all components relative to the inside of the pipe but utilizes a large number of hydraulic cylinders in order to accomplish this purpose, the large number of hydraulic cylinders causing the entire system to be relatively complex. It is with overcoming the foregoing deficiencies of prior types of pipe clamps that the present invention is concerned.

It is accordingly one important object of the present invention to provide an improved pipe clamping device in which pipe clamping plungers are actuated by a toggle-type linkage, thereby providing the capability of a longer stroke than prior devices, or a shorter stroke at a more constant force.

Another object of the present invention is to provide an improved pipe clamping device having a minimal number of piston and cylinder type of hydraulic type motors capable of providing a radial clamping force through linkage which moves substantially only in a plane which is substantially perpendicular to the inside of the pipe, thereby cutting down on undesirable stresses in and distortion of the clamping likages.

A further object of the present invention is to provide an improved pipe clamping device in which substantially all of the forces which are experienced are substantially perpendicular to the shaft on which the various components are mounted, thereby producing a force distribution which is in the nature of the forces experienced in a beam system, which in turn tends to minimize warping and uneven forces on the pipe clamping device. Other objects and attendant advantages of the present invention will readily be perceived hereafter.

The present invention relates to a device for clamping into engagement with the inside of a pipe comprising a central supporting shaft, rotatable actuator means journalled on said shaft, frame means secured to said shaft, a plurality of plunger means spaced circumferentially about said shaft, mounting means mounting said plunger means on said frame means for movement toward and away from said inside of said pipe, linkage means coupling said plunger means to said rotatable actuator means, and motor means coupled to said rotatable actuator means for rotating said rotatable actuator means relative to said frame means to thereby cause said linkage means to move said plunger means toward and away from said inside of said pipe.

The present invention will be more fully understood when the following portions of the specification are read in conjuction with the accompanying drawings wherein.

Figure 1:
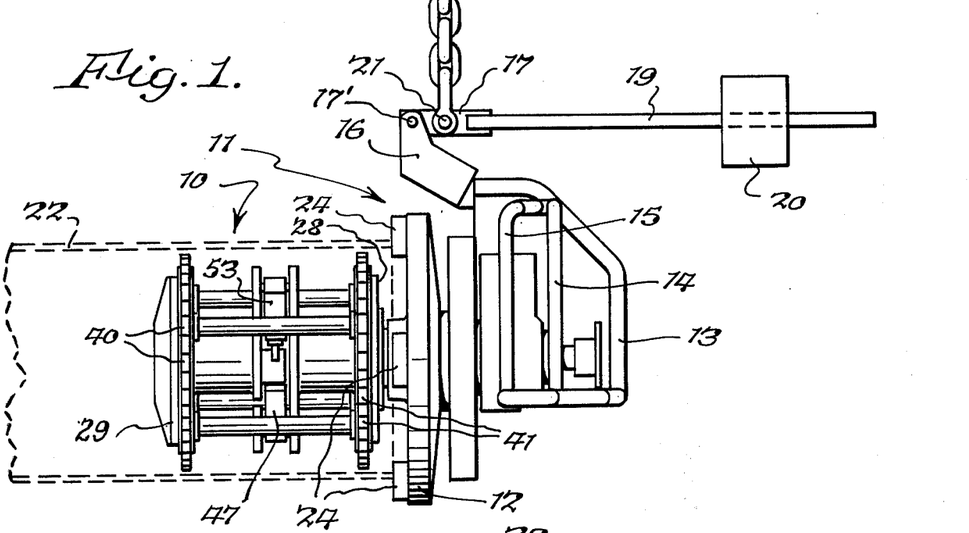
FIG. 1 is a side elevational view of the improved pipe clamping device mounted on an edge finishing unit and being shown in relation to a pipe into which it is clamped.

The improved pipe clamping device 10 of the present invention is shown mounted on a pipe edging device 11 with which it is associated. The pipe edging device includes a frame consisting of plate 12 and frame members 13, 14 and 15. A plate 16 is suitably attached to frame member 13 and in turn pivotally mounts link 17 at 17'. A chain 18, which is associated with a hoist is attached to link 17 by pin 21. A lever arm 19 forms an extension of link 17 and slidably carries a weight 20 which can be moved back and forth on lever 19 so that the pipe edging device 11 may be balanced about fulcrum 21 to raise and lower it minor amounts as might be required both prior to and after the clamping device is inserted into pipe 22, as explained in detail hereafter.

The clamping device 10, as demonstrated in the present invention, is for the purpose of clamping device 11 rigidly relative to pipe 22. Thereafter, blocks 24, which are mounted on a portion 23 (FIG. 2) associated with plate 12 and which carry suitable cutting tools (not shown), are driven by suitable structure (not described) to provide a beveled circumferential edge 25 on pipe 22. The clamping unit 10 not only holds the device 11 in proper position, but also, by virtue of providing a substantially continuous circumferential force against axially spaced portions of the inside of pipe 22, actually tends to place the pipe into perfectly cylindrical shape, if for any reason it should be distorted prior to the time that the clamping force is applied thereto.

Figure 2:
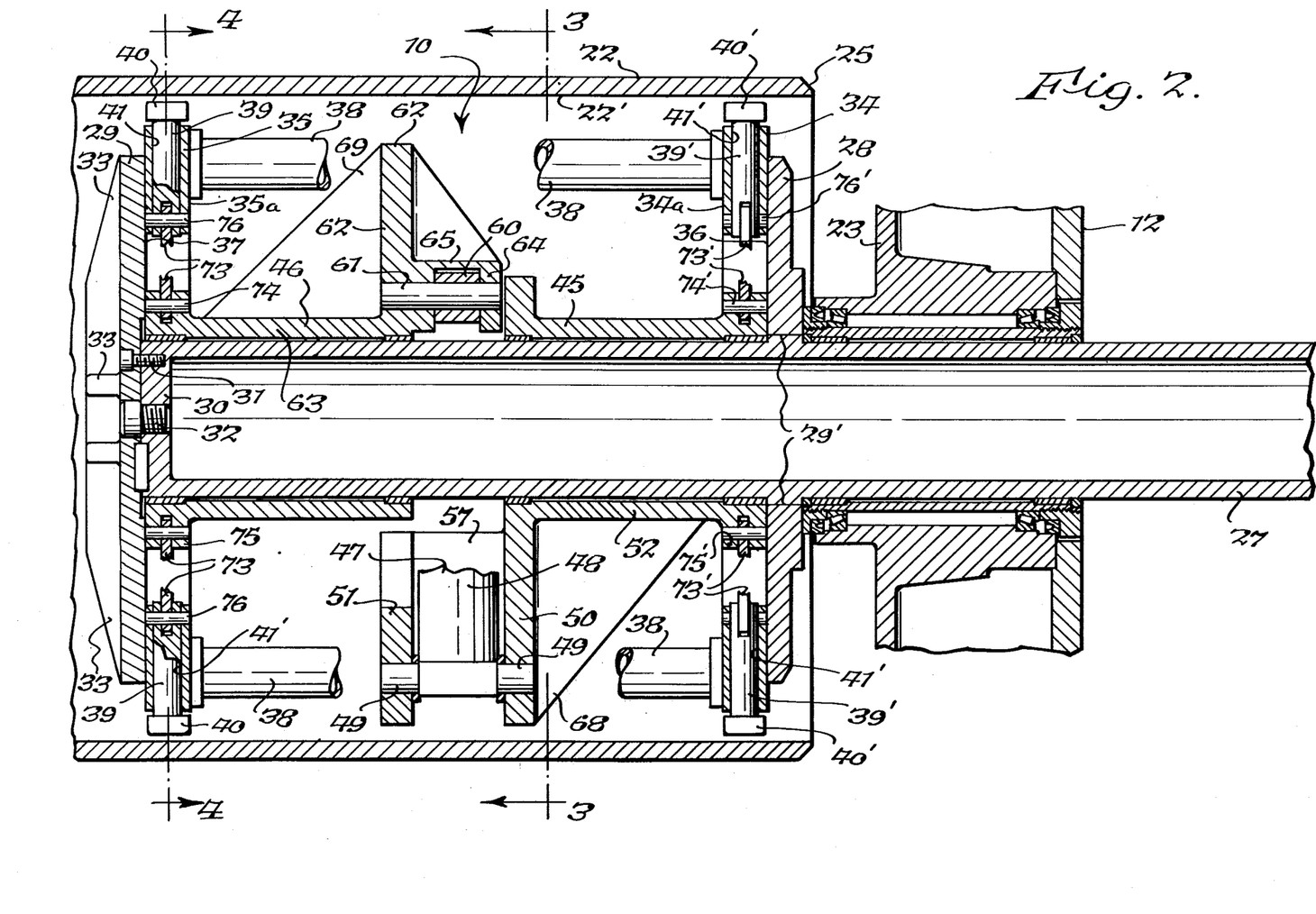
FIG. 2 is fragmentary enlarged cross sectional view taken substantially along line 2—2 of FIG. 3.

The pipe clamp 10 includes a central shaft member 27, which in addition to mounting plates 12 and 23, also fixedly mounts spaced annular frame members 28 and 29. Frame member 28 has its annular edge welded to shaft 27 at 29'. Frame member 29 is secured to shaft end 30 by means of screw 32 and a plurality of circumferentially spaced screws 31. Frame member 29 includes gussets 33 which provide rigidity thereto. Annular rings 34 and 35, which are identical, are rididly connected, as by welding, or suitable screws (not shown) to the facing faces 36 and 37 of frame members 28 and 29, respectively, and thus annular rings 34 and 35 themselves become fixed portions of the frame members. Struts 38 have their inner faces suitably secured as by screws (not shown) to the facing faces 34a and 35a of annular members 34 and 35, respectively, to rigidize such members against undesired deflection.

A plurality of circumferentially spaced plungers 39 are slidably mounted in radial bores 41 in frame member 35. Each plunger has a clamping foot 40 at its outer end which moves into complementary mating engagement with the inner surface 22' of pipe 22, as shown in FIG. 5. As can be seen from FIG. 4, there are twenty-four plungers 39 and these plungers are equidistantly spaced about the circumference of member 35 at angles of 15°. Frame member 34 carries an identical number of plungers and for the sake of brevity, the plungers and their associated structure are designated with primed numerals which represent the identical structure as the same unprimed numerals associated with member 35.

Figure 3:
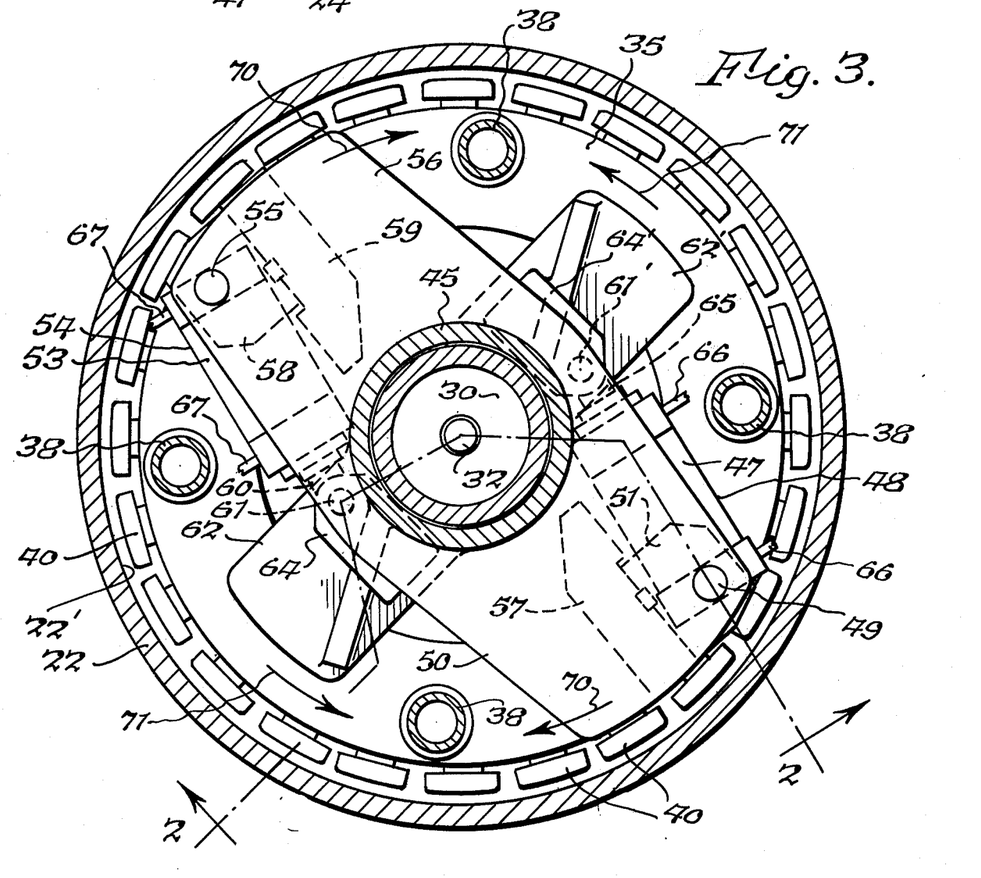
FIG. 3 is a cross sectional view taken substantially along line 3—3 of FIG. 2 and showing the pipe clamping device in position within the pipe but not in clamping position.
Figure 4:
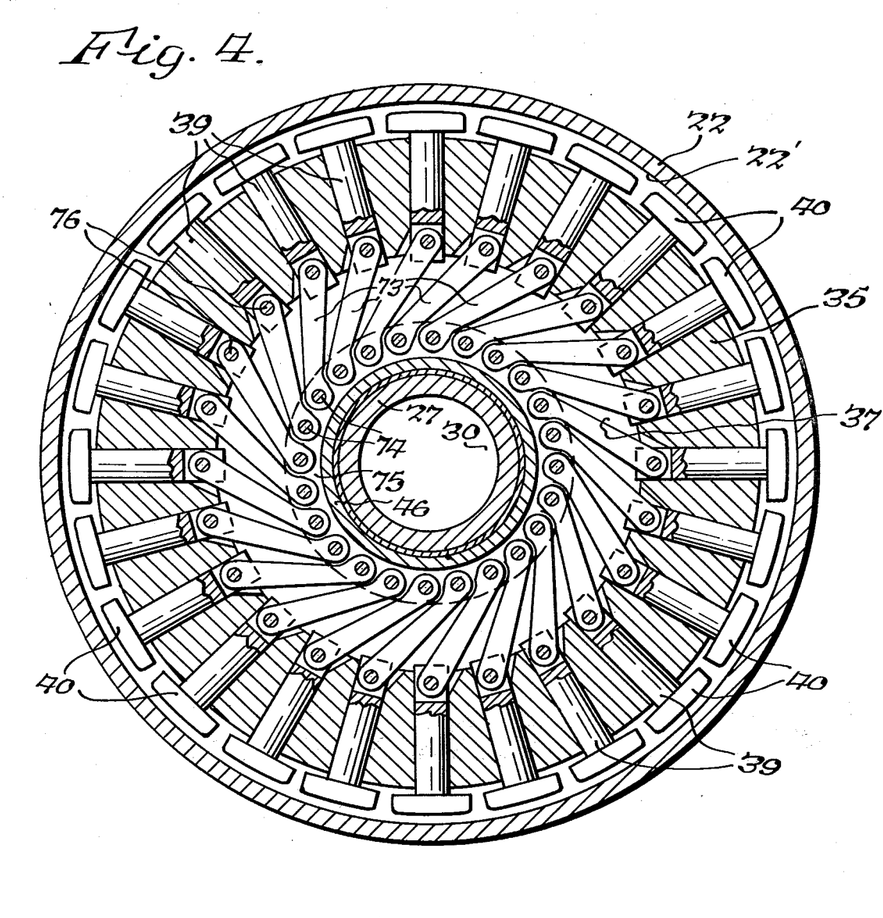
FIG. 4 is a cross sectional view taken substantially along line 4—4 of FIG. 2 and showing the details of how the various plungers and related linkage are mounted.
Figure 5:
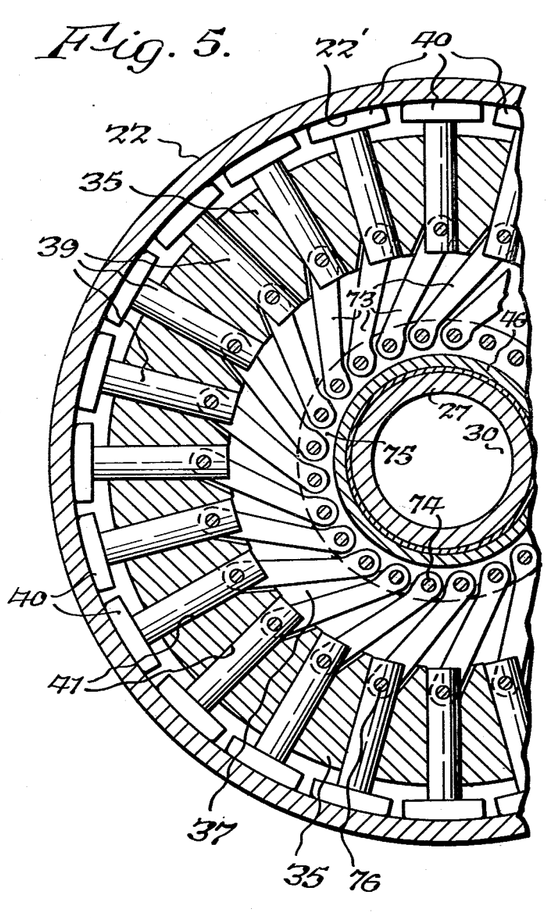
FIG. 5 is a fragmentary cross sectional view similar to FIG. 4 but showing the plungers in clamping position.

In order to move plungers 39 between the positions shown in FIG. 4 and FIG. 5, a hydraulically actuated structure is provided. In this respect, annular rotatable actuator members 45 and 46 are journalled on shaft 27. A piston and cylinder-type motor 47 (FIGS. 2 and 3) has cylinder portion 48 with pintles 49 extending outwardly from opposite sides thereof which are pivotally received within plates 50 and 51 of member 45. In this respect, it can be seen that member 50 extends perpendicularly to the cylindrical portion 52 of member 45. A plate 57 is secured to plate 50 and a plate 51 is secured to plate 57. Analogous structure is used to mount piston and cylinder-type motor 53 on the opposite end of plate 50. In this respect, the cylinder portion 54 has spaced pintles 55 on its end, and these pintles are pivotally mounted between portion 56 of plate 50 and plate 58, which is analogous to plate 51, and which is attached to plate portion 56 by means of plate 59, which is analogous to plate 57.

The piston ends of hydraulic motors 47 and 53 are connected to the rotatable actuators to which their associated cylinders are not connected. In this respect, the piston 60 associated with cylinder 53 is pivotally mounted on pin 61 (FIG. 2) which extends between plate 62, which extends perpendicularly to cylindrical portion 63 of rotatable actuator 46, and plate 64 which is attached to plate 62 by means of portion 65. Structure which is analogous to elements 61, 62, 64 and 65, and which are designated by the same numerals with corresponding primes, is located in diametrically opposite relationship to members 61, 62 and 64 and is mounted on cylindrical actuator portion 63. The piston 65 associated with cylinder 48 is pivotally mounted on pin 61'. Gussets 68 are located between portions 52 and 50 for rigidity purposes, and gussets 69 are provided between portions 62 and 63 for rigidity purposes.

Hydraulic conduits 66 and 67 are associated with motors 47 and 53, respectively, and supply hydraulic fluid thereto in the conventional manner. Whenever it is desired to move feet 40 and 40' into engagement with the inside wall of pipe 22, it is merely necessary to actuate motors 47 and 53 to cause their respective pistons 65 and 60 to move outwardly therefrom. This will cause annular actuator members 45 to pivot in the direction of arrows 70 and will simultaneously cause annular actuator 46 to pivot in the direction of arrows 71. Thus, actuators 45 and 46 will pivot in opposite directions (FIG. 3).

A plurality of links 73 have their inner ends pivotally mounted on pins 74 which are located in bifurcated annular rim 75 (FIG. 2) of member 46. The opposite ends of links 73 are pivotally mounted on pins 76 located at the bifurcated inner ends of plungers 39. As will become more apparent from the discussion of FIGS. 8a–8b and FIGS. 9a–9b, each link 73 in conjunction with rotatable actuator 46 essentially comprises a toggle-type linkage having the type of action and advantages discussed in detail hereafter. Structure which is identical to the foregoing structure and which is associated with plungers 39' of frame 34 are designated by identical numerals which are primed.

By virtue of the fact that the annular rims 75 and 75' of actuator members 46 and 45, respectively, will rotate in opposite directions while frame members 35 and 34, respectively, are maintained stationary, links 73 and 73' will move and drive plungers 39 and 39', respectively, radially outwardly so that their feet 40 and 40', resepectively, will engage the inner surface of pipe 22. It will be appreciated that the required amount of hydraulic pressure is supplied to cylinders 47 and 53 to provide the desired clamping force and straightening action to pipe 22. Whenever it is desired to return plungers 39 to the position of FIG. 4 after they have been in the position of FIG. 5, it is merely necessary to reverse the hydraulic flow to motors 47 and 53 to thereby reverse the above described action of links 73 and 73'.

It will be appreciated that the hydraulic actuating structure produces a differential action in the sense that the actuator members 45 and 46 tend to rotate in opposite directions simultaneously. If the unit 10 were placed in the pipe 22 in a canted position, the feet 40 at the end 29 would be resting on the bottom of the pipe while the feet 40' at end 28 would be bearing against the top of the pipe, or vice versa. However, assuming that feet 40 were resting on the bottom, they would be pressing with more force than feet 40' would be pressing on the top, because of the weight of the unit. When the hydraulic cylinders were actuated, plungers 39' carrying the feet 40' would therefore move into engagement with the inside of the pipe before plungers 39 could move radially. However, under these circumstances the plate 28 would not be perfectly perpendicular to the axis of the pipe. After all of the feet 40' were engaged, the plungers 39 associated with end 29 would move out. However, they too would tend to engage the inside of the pipe in a manner which was not perfectly perpendicular. It would only be after a great amount of hydraulic force was applied to plungers 39 and 39' that the device 10 would tend to align itself coaxially with the inside of the pipe. However, in doing so there would have to be slippage of feet 40 and 40' relative to the inside of the pipe.

The balancing mechanism 19–20 tends to obviate the foregoing problem. In this respect, the balancing mechanism tends to cause unit 10 to extend substantially horizontally at the time it is inserted into pipe 20. Furthermore, if for any reason it appears that it is not perfectly horizontal, as would be evidenced by the fact that the end 29 was resting on the bottom of the pipe while the end 28 was bearing against the top, then the weight could be moved outwardly to the right in FIG. 1 so as to cause the end 29 to move upwardly and the end 28 to move downwardly so that the unit 10 would extend horizontally to the inside of the pipe. At this time the hydraulic cylinders could be actuated to cause feet 40 and 40' to move into engagement with the inside of the pipe while ends 28 and 29 were oriented substantially perpendicularly to the axis of the pipe.

Figure 6:
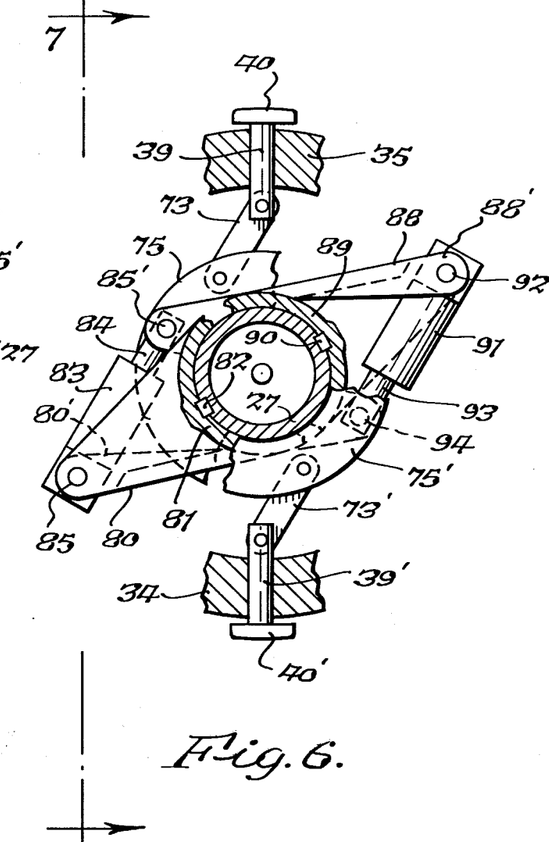
FIG. 6 is a fragmentary cross-sectional view taken generally in the direction of line 6—6 of FIG. 7 and showing a modification of the present invention wherein each set of plungers can be actuated independently of the other.
Figure 7:
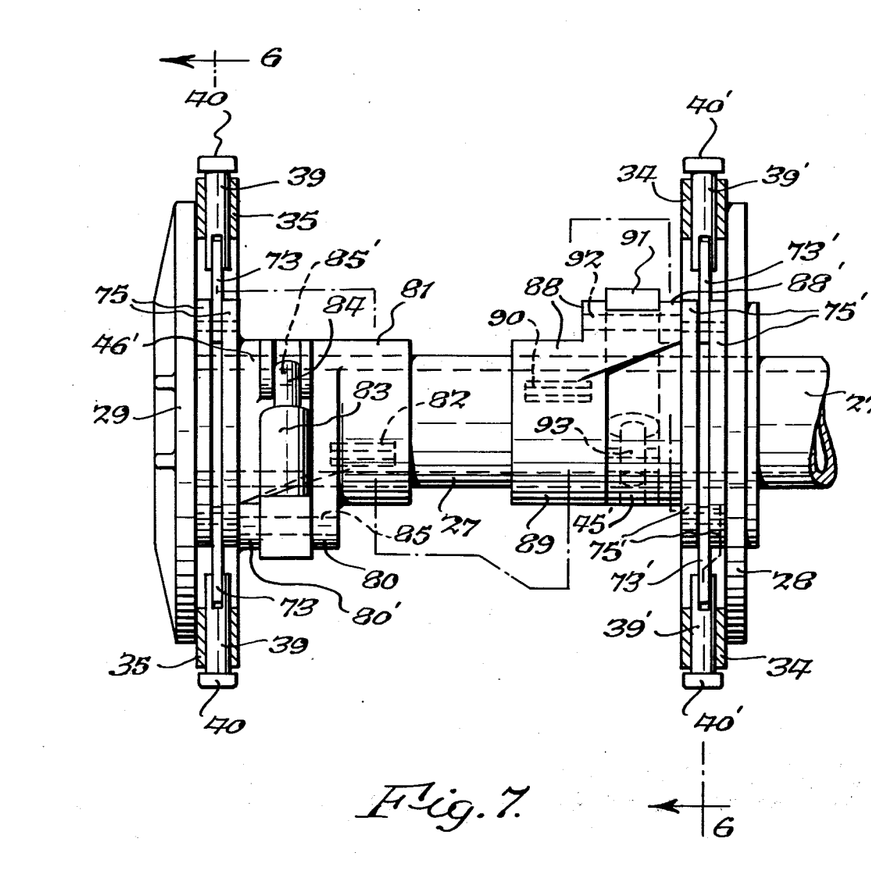
FIG. 7 is a side elevational view taken generally in the direction of line 7—7 of FIG. 6.

While the foregoing description has been directed to a unit wherein the hydraulic motors were effectively positioned between rotatable actuators 45 and 46, it will be appreciated that the structure of the present invention can be modified so that one end of each hydraulic motor can bear against a tab or the like which is fixedly attached to shaft 27. In this event, each actuator 45 or 46 could be pivoted independently of the other by actuating the hydraulic motor associated therewith. The advantage of this construction is that if the unit 10 is titled, the plungers associated with end 29, which bears against the bottom of pipe 22, can be actuated first to cause the unit to level itself before the plungers associated with end 28 are actuated, and vice versa. In this type of modification an arm 80 is fixedly mounted on collar 81 which is keyed to shaft 27 at 82. A hydraulic motor consisting of cylinder 83 and piston 84 has cylinder 83 pivotally pinned to arm 80 by pin 85 which extends between arm 80 and an outboard boss 80' suitably connected to arm 80. The outer end of piston 84 is pinned at 85' to collar 46' which is pivotable on shaft 27. Collar 46' is analogous to collar 46 of FIGS. 1-5. Annular rim 75 is welded to collar 46'. Whenever it is desired to move plungers 39, it is merely necessary to actuate piston-cylinder 84-83 to rotate collar 46' and annular rim 75 to which first ends of links 73 are pivotally attached. The other ends of links 73 are pivotally pinned to plungers 39 slidably mounted in frame member 35. A second arm 88 is fixedly secured to collar 89 which is keyed to shaft 27 at 90. A cylinder 91 is pivotally pinned to arm 88 by pin 92 which extends between arm 88 and a boss 88' which is suitably connected to arm 88. The piston 93 associated with cylinder 91 is pivotally pinned to collar 45' at 94. Collar 45' is analogous to collar 45 of FIGS. 1-5, and is pivotally mounted on shaft 27. Links 73' have their opposite ends pivotally pinned to annular rim 75' and plungers 39'. Annular rim 75' is welded to collar 45'. Whenever it is desired to actuate plungers 39', it is merely necessary to actuate piston-cylinder 93-91 to rotate collar 45' and rim 75'. It can readily be seen that plungers 39 can be actuated independently of plungers 39' in the modification of FIGS. 6 and 7. If desired, collars 81 and 89 may be made integrally with each other to constitute a single collar and arms 80 and 88 may constitute a single arm. The basic prerequisite of the structure of FIGS. 6 and 7 is that the ends of cylinders 83 and 91 be mounted on a member which is fixed with respect to shaft 27.

Figure 8A:
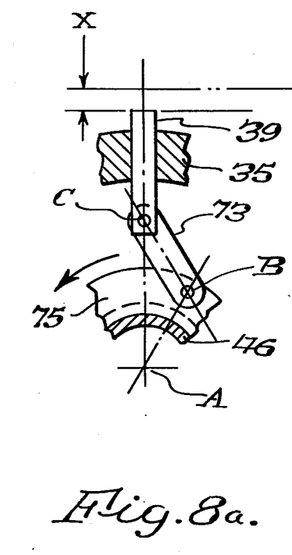
FIGS. 8a and 8b are fragmentary schematic representations of the linkage of the present invention in extreme positions.
Figure 8B:
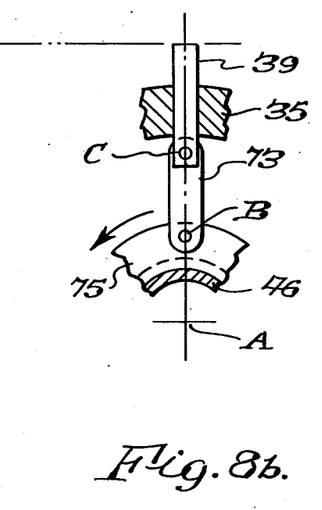
Figure 9A:
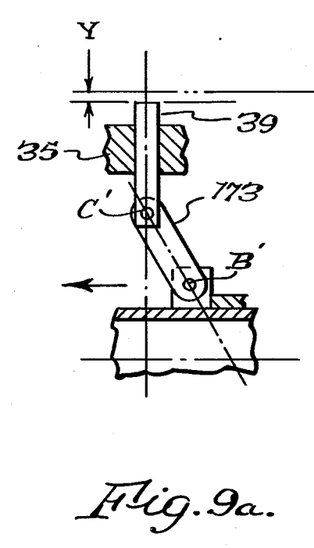
FIGS. 9a and 9b are fragmentary schematic representations of the prior art linkage in extreme positions.
Figure 9B:
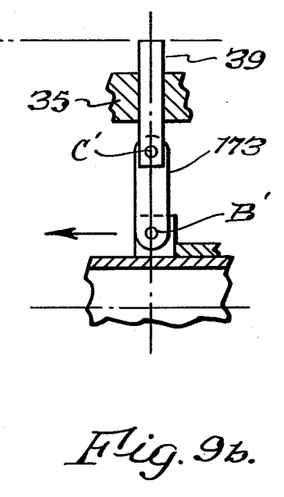

The improved geometry to the toggle-type linkage of the present invention, as shown in FIGS. 8a and 8b can be more fully appreciated when it is compared to the geometry of prior art linkages, such as shown in FIGS. 9a and 9b. In this respect, it can readily be seen that when rim 75 of annular member 46 is rotated, in accordance with the present invention, in the direction of the arrow from its position shown in FIG. 8a to the position shown in FIG. 8b, plunger 39 will move a total distance X. This movement is due to the fact that link 73 will move from the inclined position of FIG. 8a to the fully vertical position of FIG. 8b and because the pivot point B moves from the position shown in FIG. 8a to the position shown in FIG. 8b. In other words, the rotation of rim 75 is equivalent to a toggle action wherein the toggle consists of link 73 and an imaginary link extending between points A and B. In contrast to the foregoing action, in the prior art devices wherein the link 173 is moved in the direction of the arrow by a reciprocatory movement, as is common in the prior art, rather than a rotary movement, link 173 will move from the inclined position shown in FIG. 9a to the vertical position shown in FIG. 9b without a corresponding toggle action. This will cause a movement of plunger 39 from the position shown in FIG. 9a to the position shown in FIG. 9b for a total distance Y. However, according to the geometry of the figures, it can be seen that distance X is approximately twice the distance Y. This is due to the fact that point B' of FIGS. 9a and 9b does not approach frame member 35 as does point B of FIGS. 8a and 8b. In essence, therefore, the various embodiments of the present invention, as depicted by FIGS. 8a and 8b, posses a toggle action which results in a greater movement of plunger 39 than is obtainable with the straight linkage action depicted in FIGS. 9a and 9b.

The advantage of the improved linkage of the present invention is that a plurality of options are available which are not available with the prior art linkages depicted in FIGS. 9a and 9b. In this respect, as can be seen from a comparison of FIGS. 8a and 9a, the present invention can provide either a double length of stroke or provide the same stroke with a lesser angle of movement of the link 73. When only a smaller amount of movement is required, the linkage 73 in moving from the position shown in FIG. 8a need not move all the way to the position shown in FIG. 8b, and this permits the use of higher hydraulic pressures because of the fact that the link 73 and the plunger 39 need not move to the straight line position shown in FIG. 8b. In this respect, whenever the link 73 is moving in an area where it is not near the vertical position of FIG. 8b, the force on plunger 39 is more constant because when it approaches the position shown in FIG. 8b, the forces increase at a much higher rate for the same increments of angular change of link 73. In other words it is undesirable to cause link 73 to approach alignment with plunger 39 because in the area where the links are aligned the forces applied to the links are extremely large and cannot be controlled readily and the parts are subjected to excessive strain. The combination of a more constant force over a longer distance gives a longer workable stroke. Thus, the various options which are available with the present linkage are (1) a greater stroke of the plunger In FIGS. 8a-8b relative to FIGS. 9a-9b for the same angular movement of the link 73 or 173 in each, and (2) the same stroke as in the prior art with a lesser angle change of the link 73, thus producing a more constant force throughout the stroke.

In summary, the structure of the present invention provides a numer of advantages. In this respect, all of the actuating mechanism is exposed and readily accessible. In this respect, it can readily be seen that all of the moving parts are located outwardly of cylindrical actuator portions 52 and 63 and therefore are readily accessible for replacement, repair and maintenance. In addition, the links 73 and 73' remain in the same plane perpendicular to shaft 27 throughout their extent of movement. Therefore, they are not subjected to forces axially of shaft 27. In addition, they will provide a relatively long stroke to plungers 39 or a shorter stroke at a more constant force. In addition to the foregoing, all forces to which the clamping mechanism is subjected are transmitted directly to shaft 27 in a substantially perpendicular direction relative thereto so that shaft 27 acts in the nature of a beam. By doing so, the forces which would tend to be applied to frame members 28 and 29 in a direction other than perpendicular to shaft 27, are minimized so that there is little tendency for these frame members to wrap. In addition to the foregoing, the forces in the entire system associated with the pipe clamping device are balanced, thereby minimizing any resulting distortion which could occur.

It can thus be seen that the improved pipe clamping device of the present invention is manifestly capable of achieving the above enumerated objects and while preferred embodiments have been disclosed, it will be appreciated that the present invention is not limited thereto but may be otherwise embodied within the scope of the following claims.

We claim:

1. A device for clamping into engagement with the inside of a pipe comprising a continuous central supporting shaft, first and second axially spaced rotatable actuator means having first and second cylindrical portions, respectively, journalled on said shaft, first and second frame means fixedly secured to said shaft proximate said first and second rotatable actuator means, respectively, a plurality of first and second plunger means spaced circumferentially about said shaft, mounting means mounting said first and second plunger means on said first and second frame means, respectively, for movement toward and away from said inside of said pipe, first and second linkage means coupling said first and second plunger means, respectively, to said first and second rotatable actuator means, respectively, and motor means coupled to said first and second rotatable actuator means for rotating said first and second rotatable acutator means relative to said first and second frame means, respectively, to thereby cause said linkage means to move said first and second plunger means, respectively, toward and away from said inside of said pipe.

2. A device as set forth in claim 1 wherein said continuous central supporting shaft has a central portion and first and second spaced end portions on opposite sides of said central portion, and wherein said first and second rotatable actuator means for journalled on said central portion, and wherein said first and second frame means are fixedly mounted on said first and second end portions, respectively.

3. A device as set forth in claim 2 including a plurality of strut members rigidly affixed between said first and second frame members, said strut members lying outwardly of said central supporting shaft and substantially parallel thereto.

4. A device as set forth in claim 2 wherein said motor means comprise fluid actuated piston and cylinder type motor means, effectively coupling said piston and cylinder type motor means between said first and second rotatable annular members to cause said annular members to rotate in opposite directions.

5. A device as set forth in claim 2 wherein said mounting means comprise substantially radial bores in said first and second frame members with said first and second plungers being mounted for sliding movement in said bores.

6. A device as set forth in claim 1 wherein said first and second rotatable actuator means comprise first and second annular members, respectively, and wherein said linkage means comprise an elongated link between each of said plungers and its respective annular member, and wherein each of said first and second plunger means comprises first and second plungers, each said elongated link having first and second ends and extending transversely to its associated plunger, a first pivotal connection between said first end of each said elongated link and its associated annular member, and a second pivotal connection between said second end of each said elongated link and its associated plunger.

7. A device as set forth in claim 6 wherein said mounting means comprise substantially radial bores in said first and second frame members with said first and second plungers being mounted for sliding movement in said bores.

8. A device as set forth in claim 6 wherein said motor means comprise a plurality of fluid actuated piston and cylinder type motor means coupled between said first and second annular members to cause said annular members to rotate in opposite directions.

9. A device as set forth in claim 6 wherein said motor means are coupled between said annular members to cause said annular members to rotate in opposite directions.

10. A device as set forth in claim 1 wherein said motor means comprise first and second motors fixedly mounted relative to said shaft, with said first motor being coupled to said first annular member and said second motor being coupled to said second annular member, whereby said first and second annular members may be rotated independently of each other.

11. A device as set forth in claim 10 wherein said first and second motors comprise fluid actuated piston and cylinder type motors.

12. A device for clamping into engagement with the inside of a pipe comprising a central supporting shaft, rotatable actuator means journalled on said shaft, frame means secured to said shaft, a plurality of plunger means spaced circumferentially about said shaft, mounting means mounting said plunger means on said frame means for movement toward and away from said inside of said pipe, linkage means coupling said plunger means to said rotatable actuator means, motor means coupled to said rotatable actuator means for rotating said rotatable actuator means relative to said frame means to thereby cause said linkage means to move said plunger means toward and away from said inside of said pipe, said rotatable actuator means comprising first and second annular members axially spaced on and journalled on said shaft, said frame means comprising spaced first and second frame members on said shaft, said plunger means comprising first and second plungers mounted on said first and second spaced frame members, respectively, means for suspending said device, and balancing means for adjusting said device to a predetermined attitude when said device is suspended.

13. A device as set forth in claim 12 wherein said mounting means comprise substantially radial bores in said first and second frame members with said first and second plungers being mounted for sliding movement in said bores.

14. A device as set forth in claim 10 wherein said linkage means comprise an elongated link between each of said plungers and its respective annular member, each said elongated link having first and second ends and extending transversely to its associated plunger, a first pivotal connection between said first end of each said elongated link and its associated annular member, and a second pivotal connection between said second end of each said elongated link and its associated plunger.

15. A device as set forth in claim 14 wherein said motor means comprise a plurality of fluid actuated piston and cylinder type motors coupled between said first and second annular members to cause said annular members to rotate in opposite directions.

16. A device as set forth in claim 12 wherein said motor means are coupled between said annular members to cause said annular members to rotate in opposite directions.

17. A device as set forth in claim 12 wherein said motor means comprise first and second motors fixedly mounted relative to said shaft, with said first motor being coupled to said first annular member and said second motor being coupled to said second annular member, whereby said first and second annular members may be rotated independently of each other.

18. A device as set forth in claim 16 wherein said motor means comprise fluid actuated piston and cylinder type motors.

* * * * *

UNITED STATES PATENT OFFICE
CERTIFICATE OF CORRECTION

PATENT NO. : 4,042,231
DATED : August 16, 1977
INVENTOR(S) : John F. Kopczynski and Paul F. Kluczynski It is certified that error appears in the above-identified patent and that said Letters Patent are hereby corrected as shown below:

Column 3, line 3, change "rididly" to --rigidly--.
Column 4, lines 23 and 24, change "resepectively" to --respectively--;
 line 62, change "pipe 20" to --pipe 22--.
Column 5, line 16, change "titled" to --tilted--;
 line 55, change "to" to --of--.
Column 6, line 19, change "posses" to --possess--.
Column 7, line 7, change "wrap" to --warp--;
 line 45, (claim 2), change "for" to --are--;
 line 56, (claim 4), before "effectively" insert --and means--.
Column 8, line 61, (claim 14), change "claim 10" to --claim 13--.

Signed and Sealed this

Eighth Day of November 1977

[SEAL]

Attest:

RUTH C. MASON
*Attesting Officer*

LUTRELLE F. PARKER
*Acting Commissioner of Patents and Trademarks*